Aug. 5, 1958  J. C. HAWKINS  2,846,069
DEVICES FOR SEPARATING HAULM, WEEDS AND
LIKE MATTER FROM ROOT CROPS
Filed Nov. 24, 1954  2 Sheets-Sheet 1

Inventor
John C. Hawkins
By Watson, Cole,
Grindle & Watson
Attorneys

Aug. 5, 1958
J. C. HAWKINS
2,846,069
DEVICES FOR SEPARATING HAULM, WEEDS AND
LIKE MATTER FROM ROOT CROPS
Filed Nov. 24, 1954
2 Sheets-Sheet 2
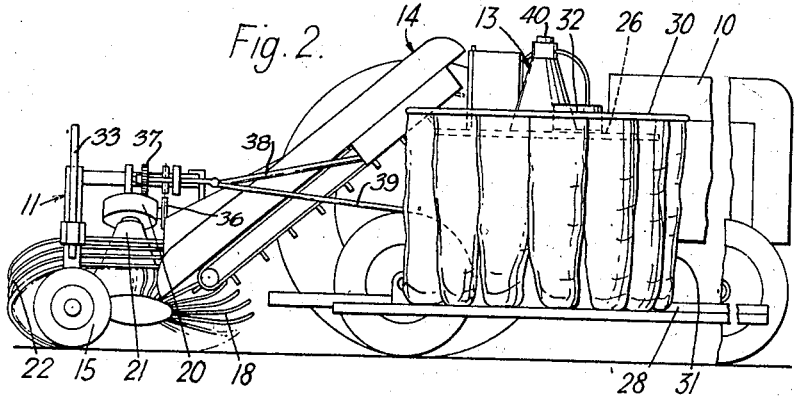
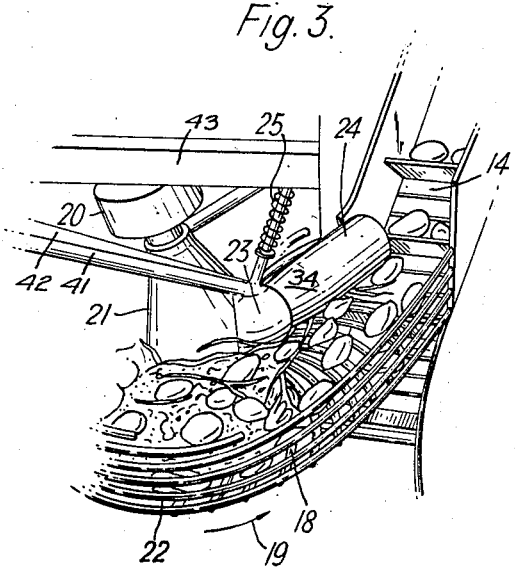
Inventor
John C. Hawkins
By Watson, Cole,
Grindle & Watson
Attorneys

United States Patent Office 2,846,069
Patented Aug. 5, 1958

2,846,069

DEVICES FOR SEPARATING HAULM, WEEDS AND LIKE MATTER FROM ROOT CROPS

John Clement Hawkins, Silsoe, England, assignor to National Research Development Corporation, London, England, a corporation Application November 24, 1954, Serial No. 471,040

Claims priority, application Great Britain November 27, 1953

6 Claims. (Cl. 209—235)

This invention relates to devices for separating haulm, weeds and like matter from root crops such as potatoes.

Such a device, according to the present invention, comprises a movable support for the root crops and a roller which bears on the support with its axis oblique to the direction of motion of the support, whereby haulm, weeds and like matter are nipped by the roller and the support and pass on between them, but the roots are deflected sideways by the roller. The roots are thus effectively separated from the haulm, weeds, and like matter.

Preferably the roller is rotated by frictional contact with the movable support.

The diameter of the roller is not critical, but it should not be so small that haulm, weeds and like matter could easily wrap round it, nor so large that it would nip the roots. For use with potatoes, diameters of from about 4 to about 8 inches have been found satisfactory.

The obliquity of the roller with respect to the direction of motion of the support at the line of contact with the roller can be varied within wide limits. The most suitable angle can best be determined by tests, since it depends on several factors such as its own diameter, the nature of the support, and the crop for which it is to be used. The most suitable angle will generally lie between 45° and 60°.

Preferably the roller is pressed against the support, for instance by a spring or by weight so that it can rise and fall.

The end of the roller which first meets the advancing crop may be tapered to provide a clearance between it and the support which affords a lead-in for the haulm, weeds and like matter.

The movable support may be any support which will carry the crop and not prevent the sideways deflection of the roots. Thus, for instance, the support may be a rotary spider.

The device is suitable for incorporation in machines or installations which handle root crops and which include a movable support for moving the crops. When the device is incorporated in such a machine or installation the said movable support of the machine also constitutes the movable support of the device.

One machine of the general kind to which the device may be applied is the potato harvesting machine described in my British Patent No. 716,568, complete specification accepted October 6, 1954, in which there is a rotary spider for conveying potatoes from a lifting share to the foot of a lifting conveyor which delivers them to a sorting conveyor, the potatoes being deflected from the rotating spider to the foot of the lifting conveyor by deflector plate. Such a machine may be modified according to the present invention by substituting for the deflector plate a roller which bears on the spider with its axis oblique to the direction of motion of the spider at the line of contact with the roller, whereby haulm, weeds and like matter are nipped between the roller and the spider and pass on between them, but the potatoes are deflected by the roller off the edge of the spider and on to the foot of the lifting conveyor.

A potato or other root harvesting machine may also embody a further feature of the invention, namely a sorting conveyor in the form of a rotating table on which the roots separated from haulm, weeds and the like matter are deposited at one point and progressively moved round in front of several sorters stationed around the table who pick selected roots off the table and place them in bags, chutes or other suitable receptacles, so that ultimately only waste matter is left on the table which is then deflected therefrom before the point at which the roots are supplied.

The invention may be performed in various ways, and one particular application of it to a potato harvesting machine will now be specifically described by way of example with reference to the accompanying drawings, in which:

Figure 2 is a side view of the machine; and

Figure 3 is a perspective view of the spider, the haulm-separating roller, and the elevating conveyor.

Figure 1:
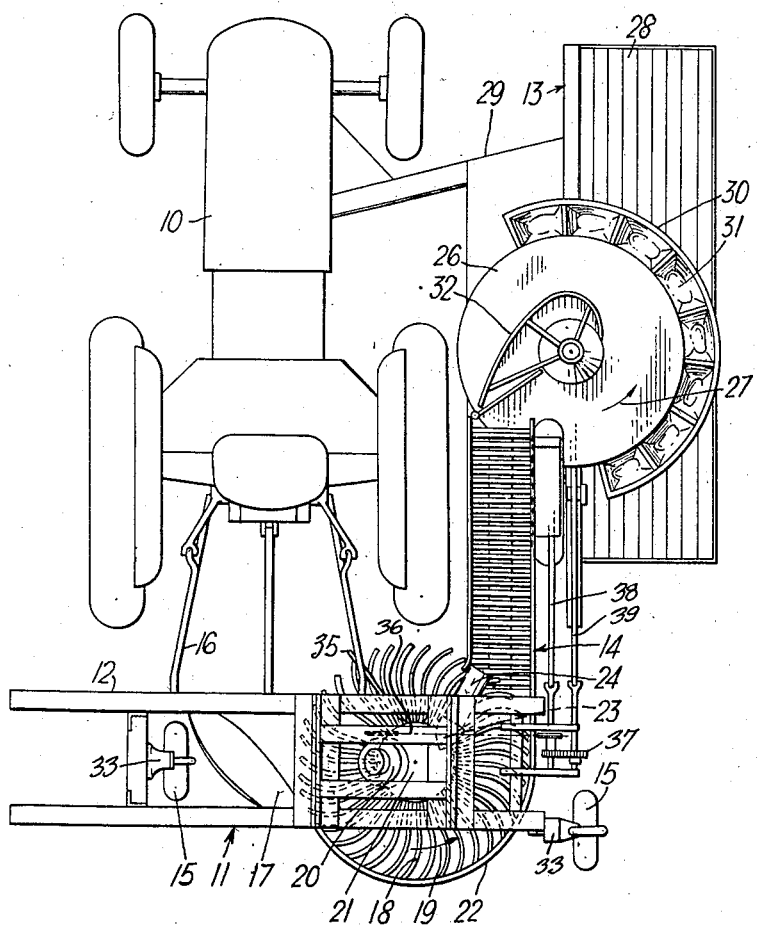
Figure 1 is a plan view of the machine.

The machine shown in the accompanying drawings is mounted on, and propelled by, a tractor 10. It comprises three main units, namely a lifting unit 11 mounted on a tool bar 12 attached to the tractor, a sorting unit 13 mounted on one side of the tractor, and a conveyor unit 14 which conveys potatoes from the lifting unit 11 to the sorting unit 13.

The tool bar 12 is carried on two wheels 15 the vertical position or depth of said wheels in relation to said tool bar being adjustable by means of conventional vertically adjustable supporting pillars 33 and is attached to the rear of the tractor by a linkage 16. The ridge of soil containing the potatoes is lifted by a concave share 17 as the machine is moved along, the share mounted as shown in Figure 2 of the aforesaid British Patent No. 716,568 and being driven round by contact with the soil. The soil and the crop lifted by the share 17 are delivered on to one side of a spider 18 which is driven in the direction of the arrows 19 through bevel gears enclosed in a gear box 20 and driven in their turn by the power take-off shaft of the tractor through conventional power transmission mechanism (not shown) which may be arranged in any suitable manner as will be apparent to those skilled in the art.

The shaft carrying the spider 18 is inclined, the lowest part of the spider being nearest to the share 17. In order to prevent haulm, weeds and like matter from becoming wrapped round the spider shaft, this shaft is surrounded by a conical shield 21. All the arms of the spider are in the same plane and they are curved backwards with respect to the direction of rotation in approximately involute form so that the spaces between adjacent arms are of approximately uniform width. A fence 22 of bars is placed around the periphery of the spider at the rear to retain the material on the spider, these bars being attached to the tool bar by their left-hand ends as shown in Figure 1 in any conventional manner.

Supported near to the foot of the cone 21 is a roller 24. The roller 24 is rotatably mounted on a shielded bearing 23 attached to downwardly projecting arms 41 and 42. The roller is pressed down by a compression spring 25 acting on the shielded bearing 23 towards said spider. The upper end of said spring bears against a member 43 of the tool bar 12. The roller 24 is set obliquely with respect to the direction of motion of the spider as it passes beneath the roller. The frictional contact between the rotating spider and the roller causes the latter to rotate. In operation, the share deposits on the lowest point of the spider the ridge containing the potatoes, which comprises not only the potatoes themselves but also soil, stones, haulm and weeds. Fine soil and small stones fall back on to the ground through gaps between the arms of the spider. Haulm, weeds and like are caught in the nip between the spider and the roller 24 whereas the potatoes, large stones and large clods of earth cannot pass under the roller and are deflected sideways so that they fall from the edge of the spider on to the conveyor 14.

The forward end of the roller is somewhat tapered at 34 to provide a clearance between it and the spider which affords a lead-in for the haulm, weeds and the like. The haulm, weeds and the like pass round on the spider beneath the roller 24 and continue round until they meet an obliquely set scraper 35 which scrapes the separated haulm, weeds and the like off the edge of the spider so that this waste matter falls back on to the ground. The scraper 35 is fixed to the tool bar 12 in any conventional manner.

The potatoes, large stones and clods of earth are carried up by the conveyor 14 and fall on to a rotating sorting table 26 which is rotated continuously in the direction of the arrow 27. The conveyor 14 and the sorting table 26 are driven from the tractor power take-off through conventional power transmission mechanism including a chain drive 36, gearing 37, and transmission shafts 38 and 39, respectively. The conveyor 14 is mounted on the tool bar 12, its framework (not shown) being rigidly secured in any suitable conventional manner to the tool bar. This table advances in front of sorters who stand on a platform 28 mounted on an outrigger bracket 29, extending from the side of the tractor. The sorting table is rotatably supported on supports (not visible) mounted on the outrigger bracket 29, a central shaft 40 of said table being mounted in the said supports in conventional journal and thrust bearings whereby said table is firmly supported on, but can be rotated relatively to, the said supports. Arranged around the periphery of the sorting table and in front of the sorters is a framework 30 supported on the said supports for the sorting table, from which are suspended sacks 31 into which the sorters drop selected potatoes which they pick from the sorting table. When the table 26 has advanced past the last sorter all the usable potatoes will have been picked off and put into the sacks 31, leaving only waste matter on the table. This waste matter is scraped off the table 26 by a stationery scraper 32 attached to said supports and falls to the ground.

What I claim as my invention and desire to secure by Letters Patent is:

1. A device for separating haulm, weeds and like matter from root crops comprising a movable support for the root crops, and a roller mounted for free rotation on said support providing a convergent nip extending lengthwise of said roller between itself and said support through which haulm, weeds and like matter can pass but roots cannot pass, said roller having its axis of rotation disposed obliquely to the direction of motion of said support at said nip to deflect the roots transversely across and off said support and separate them from said haulm, weeds and like matter trapped in said nip between said roller and said support.

2. A device according to claim 1 in which said roller is rotatably mounted on a bearing so that the motion of the support and haulm carried thereon will rotate the roller by frictional contact with said movable support.

3. A device according to claim 1 in which the angle between said axis of rotation of said roller and said direction of motion of said support is between 45° and 60°.

4. A device according to claim 1 in which the said roller has a forward end and is tapered to provide a clearance between said forward end and said support to afford a lead-in for the haulm, weeds and like matter.

5. A device according to claim 1 in which said support is a rotary spider member.

6. A device according to claim 2 in which resilient means are provided pressing said roller downwardly against said support.

References Cited in the file of this patent

UNITED STATES PATENTS

| | | |
|---|---|---|
| Re. 11,674 | Cocker | June 28, 1898 |
| 2,379,198 | Templeton | June 26, 1945 |
| 2,468,639 | Sample | Apr. 26, 1949 |
| 2,488,983 | Packman | Nov. 22, 1949 |

FOREIGN PATENTS

| | | |
|---|---|---|
| 703,243 | Great Britain | Feb. 3, 1954 |
| 716,568 | Great Britain | Oct. 6, 1954 |